Patented Aug. 20, 1929.

1,725,076

UNITED STATES PATENT OFFICE.

KARL HEUSNER AND MAX SIMON, OF LEVERKUSEN, NEAR COLOGNE-ON-THE-RHINE, GERMANY, ASSIGNORS TO GENERAL ANILINE WORKS, INC., OF NEW YORK, N. Y., A CORPORATION OF DELAWARE.

PROCESS OF PRODUCING AZO DYESTUFFS.

No Drawing. Application filed June 7, 1927, Serial No. 197,221, and in Germany April 6, 1925.

This application is a continuation-in-part application of our application Ser. No. 97,759, filed March 26, 1926, and relates to the preparation of azo dyestuffs by coupling α-naphthyl-sulfaminic sulfonic acids with diazo compounds.

By the use of the sulfaminic acids the reaction proceeds usually very uniformly producing the dyestuffs with excellent yields and eliminating the formation of undesirable by- or decomposition products. This is particularly valuable if it is desired to obtain the corresponding dyestuffs with the free amino group, as we have further found that the sulfo group of the sulfaminic acid can be easily eliminated, as for instance by boiling the sulfaminic azo compound in aqueous solution with dilute mineral acids. By this procedure better yields and more uniform products are obtained than when coupling directly the free amino compound with the respective diazo compound.

The following example illustrates the invention:

9.3 parts by weight of aniline are diazotized and coupled with 34.7 parts by weight of sodium salt of 1-naphthyl-sulfaminic-7-sulfonic acid (the sulfaminic acid of Cleves acid) in an ice cold aqueous solution containing 28 parts by weight of soda ash. After several hours stirring the coupling is completed and the orange colored dyestuff with the sulfaminic group intact can be salted out and dried. It probably has the formula:

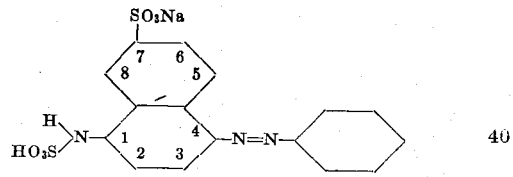

The dyestuff ordinarily is not isolated. The coupling is practically quantitative and ortho coupling is almost completely avoided. The sulfonic acid group of the sulfaminic group may be split off by heating with dilute hydrochloric acid.

For further diazotizing, the filterpressed dyestuff prepared as described is dissolved in water, treated with 80 parts by weight of a 19.5 Bé. hydrochloric acid solution at 30° C. and then with a solution of 13.8 parts by weight of sodium nitrate.

We claim:

1. As new products, monoazo dyestuffs obtained by coupling diazo compounds with α-naphthyl-sulfaminic sulfonic acid compounds, which dyestuffs are, in dry powdered form, generally reddish to yellowish powders dyeing wool orange to yellow shades.

2. As a new product, the monoazo dyesuffs obtained by coupling the diazo compound of aniline with 1-naphthyl-sulfaminic-acid-7-sulfonic acid.

In testimony whereof, we affix our signatures.

KARL HEUSNER.
MAX SIMON.